United States Patent
Healey et al.

(10) Patent No.: US 9,876,867 B2
(45) Date of Patent: Jan. 23, 2018

(54) TECHNOLOGIES FOR INFORMING A USER OF AVAILABLE SOCIAL INFORMATION ABOUT THE USER

(71) Applicant: Intel Corporation, Santa Clara, CA (US)

(72) Inventors: Jennifer A. Healey, San Jose, CA (US); Jamie Sherman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 16 days.

(21) Appl. No.: 14/583,688

(22) Filed: Dec. 27, 2014

(65) Prior Publication Data

US 2016/0191636 A1 Jun. 30, 2016

(51) Int. Cl.
*H04L 29/08* (2006.01)
*G06Q 50/00* (2012.01)

(52) U.S. Cl.
CPC ............. *H04L 67/18* (2013.01); *G06Q 50/01* (2013.01); *H04L 67/02* (2013.01); *H04L 67/306* (2013.01)

(58) Field of Classification Search
CPC ....... H04L 67/02; H04L 67/18; H04L 67/306; G06C 50/01
See application file for complete search history.

(56) References Cited

U.S. PATENT DOCUMENTS

| | | |
|---|---|---|
| 2008/0040673 A1 | 2/2008 | Zuckerberg et al. |
| 2009/0327432 A1 | 12/2009 | Augustine et al. |
| 2011/0238755 A1 | 9/2011 | Khan et al. |
| 2013/0046770 A1 | 2/2013 | Tseng |
| 2013/0151608 A1* | 6/2013 | Wiseman ................ H04W 4/02 709/204 |
| 2014/0156746 A1* | 6/2014 | Wheatley ................ H04L 67/22 709/204 |
| 2014/0269657 A1 | 9/2014 | Samsung Electronics Co Ltd |
| 2014/0282040 A1* | 9/2014 | Alfaro ..................... H04L 51/20 715/739 |

OTHER PUBLICATIONS

International Search Report for PCT application No. PCT/US2015//062687, dated Jul. 1, 2016 (3 pages).
Written Opinion for PCT application No. PCT/US2015//062687, dated Jul. 1, 2016 (8 pages).

* cited by examiner

*Primary Examiner* — Shean Tokuta
*Assistant Examiner* — Gil H. Lee
(74) *Attorney, Agent, or Firm* — Barnes & Thornburg LLP (57) ABSTRACT

Technologies for informing a user of available social information about the user include detecting the presence of a friend of the user within proximity to the user, identifying social information that has been published by the user to one or more social networking sites and accessible by the friend, and displaying the identified social information to the user. The social information may be identified based on the social networking sites on which the user and friend are interconnected. Additionally, social information marked by the friend may be determined as having been accessed by the friend. The social information may be displayed in the user in a various ways and may be arranged based on relevancy, recency, importance, or other criteria.

22 Claims, 5 Drawing Sheets

DISPLAY /128

- FRIEND: SUSAN MILLER
  - YOUR TRIP TO HAWAII
  - YOUR NEW JOB AT ACME, INC.
  - YOUR PURCHASE OF THE NEW CAR
  - YOUR DAUGHTER'S MARRIAGE
  - YOUR TRIP TO WONDER WORLD
  - YOUR BIRTHDAY

FIG. 5

TECHNOLOGIES FOR INFORMING A USER OF AVAILABLE SOCIAL INFORMATION ABOUT THE USER

BACKGROUND

As the online interconnectedness of individuals increases, along with the daily access and use of online networking, the typical individual's digital footprint grows in unison. Oftentimes, one's digital footprint has grown so large as to be near unmanageable. For example, many people forget the many social networking sites and services to which they belong and are equally unsure of which "friends" they are connected to on such networking sites and services. Additionally, due to the ever changing circle of online contacts or "friends," the typical user has only a limited oversight or knowledge about which "friends" have or have not accessed the various social information the user has posted or presented, or when such access occurred.

Prior to the widespread use of online social media, it was possible for a person to remember when they last spoke to a friend and updated them on the happenings in their life; however, the abundance of online social information has changed that social norm. The lack of knowledge of the social information available to or accessed by a "friend" can create uneasy social interactions. For example, a "friend's" discussion of social information posted to a social networking site can be quite jarring when the poster of the social information has forgotten or is otherwise unaware of the "friend's" access to the social information. However, due to the vast amount of available social information and the speed at which the social information can be consumed, a user may find it quite difficult to keep track of which "friends" are privy to which social information.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
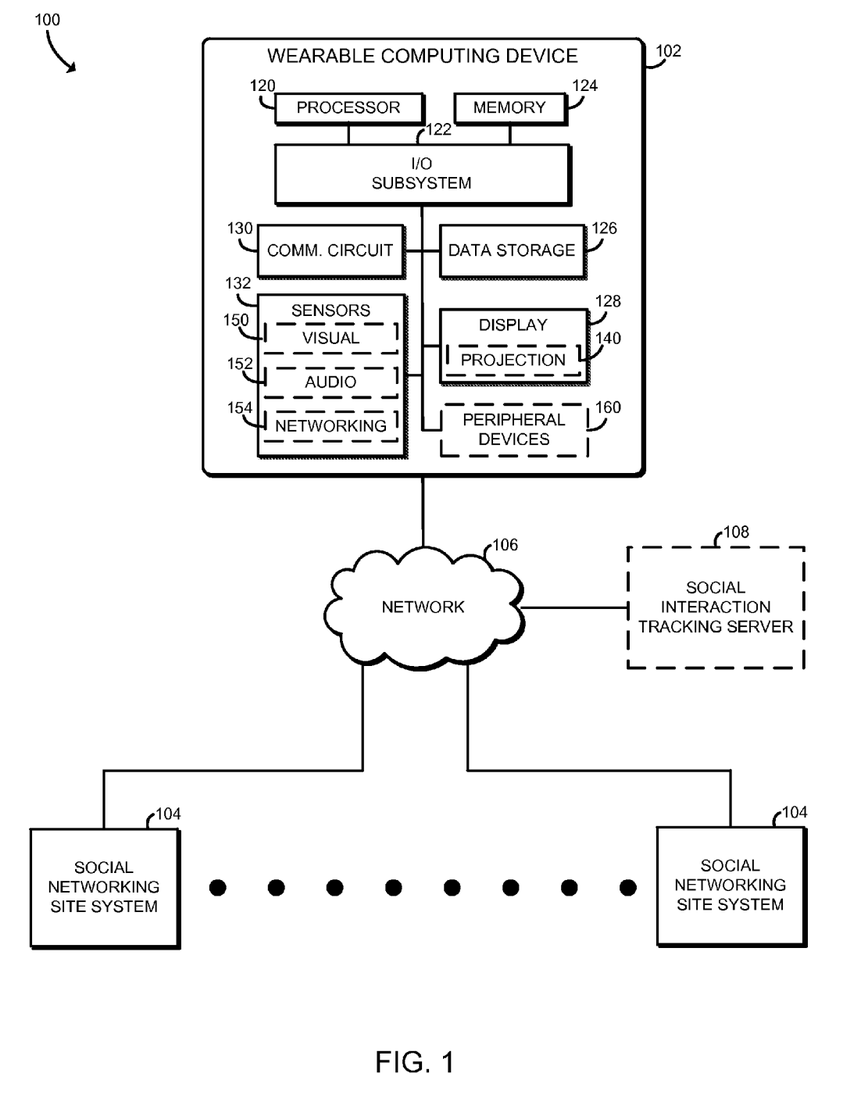
FIG. 1 is a simplified diagram of at least one embodiment of a system for determining social information available to a friend of a user.

Referring now to FIG. 1, an illustrative system 100 for determining social information available to a "friend" of a user includes a wearable computing device 102 and one or more social networking site systems 104, which may communicate with each other over a network 106. In use, as discussed in more detail below, the wearable computing device 102 is configured to detect a friend of the user in proximity to the wearable computing device 102, determine social information of the user that is accessible by the friend, and display a summary of the social information to the user as a reminder or cue of social information about the user that is likely known by the friend. As used herein, the term "friend" refers to any person with whom the user of the wearable computing device 102 has an established online social networking relationship (variously commonly referred to as a "friend," "follower," "contact," "connection," "spoke," "buddy," "member," or the like). For example, the "friend" may be a long-term actual friend who belongs to an online social group with the user (e.g., a "friend" on the user's FACEBOOK® account or other social media account) or may be an acquaintance who is connected with the user on an online social network (e.g., a "follower" on the user's TWITTER® account or other social media account).

To determine which social information may be known by the friend, the wearable computing device 102 identifies social networking sites 104 on which the user has published social information and on which the user is interconnected with the friend. The social networking sites 104 may be third-party sites, such as FACEBOOK®, LINKEDIN®, TWITTER®, or other social networking sites, and/or sites owned or operated by the user (e.g., a private blog page or website). In some embodiments, the wearable computing device 102 may retrieve all social information posted to such social networking sites based on recency of the information, relevancy to the friend (e.g., is the friend mentioned or in a posted picture), and/or importance to the user (e.g., based on number of comments). Additionally, in some embodiments, the wearable computing device 102 may identify social information actually accessed by the friend based on information provided by the social networking site 104 and/or based on an inference from the posted social information (e.g., whether the friend "liked" the posted social information, whether the friend left a post in response to the social information). Due to the potential volume of social information spread across multiple social networking sites, the wearable computing device 102 may generate a summary of the identified social information to improve the ease of viewing by the user.

The wearable computing device 102 may be embodied as any type of mobile computing device capable of being worn or carried on the user. For example, the wearable computing device 102 may be embodied as a head-mounted or "heads-up" computing device, smart glasses, a smart watch, a smart implant (e.g., a retinal implant), smart phone, smart clothing, a tablet computer, a notebook computer, a laptop computer, a cellular telephone, a handset, a messaging device, a multiprocessor system, a processor-based system, a consumer electronic device, and/or any other computing device capable of being worn or carried by the user and performing the functions described herein. As shown in FIG. 1, the illustrative wearable computing device 102 includes a processor 120, an I/O subsystem 122, a memory 124, data storage 126, a display 128, a communication circuit 130, and sensors 132. Of course, the wearable computing device 102 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), a single or multi-socket processor, a digital signal processor, a microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the wearable computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the wearable computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the wearable computing device 102, on a single integrated circuit chip.

The display 128 may be embodied as any type of display capable of displaying the social information to the user including, but not limited to, a liquid crystal display (LCD), a light emitting diode (LED), a plasma display, a cathode ray tube (CRT), or other type of display device. In an illustrative embodiment, the display 128 is embodied as a "heads-up" display on a head-mounted unit. Alternatively, the display 128 may be embodied as, for example, a see-through display or projected display of a pair of smart glasses. Additionally, in some embodiments the display may be embodied as or include a projection system 140 configured to project the identified social information, or summary thereof, onto a remote surface such as a shirt of the friend. Further, in some embodiments, the display 128 may be remote from the wearable computing device 102. In such embodiments, the display 128 may be embodied as a display of another computing device of the user, the friend (e.g., a smart phone of the friend), or a third-party (e.g., a public display).

The communication circuit 130 may be embodied as any communication circuit, device, or collection thereof, capable of enabling communications between the wearable computing device 102 and other devices of the system 100 (e.g., the social networking site systems 104 and/or a social interaction tracking server 108). To do so, the communication circuit 130 may be configured to use any one or more communication technology and associated protocols (e.g., Ethernet, Bluetooth®, Wi-Fi®, WiMAX, 4G, 5G, LTE, etc.) to effect such communication.

The sensors 132 may be embodied as any type of sensor capable of generating sensor data indicative of the proximal presence of the friend or from which such an indication can be determined. For example, the sensors 132 may be embodied as or otherwise include visual sensors 150, such as a camera (e.g., with face recognition software). In such embodiments, the visual sensors 150 may capture images of an individual in proximity to the wearable computing device, and the wearable computing device 102 may perform a facial recognition on such images to identify the individual as a friend of the user. Additionally or alternatively, the sensors 132 may be embodied as, or otherwise include, one or more audio sensors 152 configured to capture audible data within the vicinity of the wearable computing device 102. In such embodiments, the wearable computing device 102 may process the audible data to determine the presence of the friend (e.g., a voice recognition analysis). Additionally or alternatively, the sensors 132 may be embodied as, or otherwise include, one or more networking sensors 154 configured to monitor communications received by the wearable computing device 102 to identify presence of the friend. For example, in some embodiments, the networking sensor 154 may be embodied as a communication circuit configured to receive communications from a mobile computing device carried by the friend (e.g., smart phone) to indicate the friend is nearby. Additionally or alternatively, the networking sensor 154 may receive communications from other person tracking systems (e.g., an in-door person tracking system, global positioning data of the user, etc.) from which the wearable computing device 102 can determine or infer the proximal presence of the friend. Of course, in other embodiments, the wearable computing device 102 may utilize other identification and/or tracking technologies and methodologies to determine that a friend is in the vicinity of the device 102.

In some embodiments, the wearable computing device 102 may further include one or more peripheral devices 160. Such peripheral devices 160 may include any type of peripheral device commonly found in a computer device, for example, a hardware keyboard, input/output devices, peripheral communication devices, and/or other peripheral devices.

Each social networking site system 104 may be embodied as a data server or collection of servers or cloud services that support a social networking site. As discussed above, the social networking site hosted by each social networking site system 104 may be embodied as a third-party social networking site or as a personal site managed by the user. Each social networking site system 104 may include components commonly found in a server, such as a processor, memory, an I/O subsystem, data stores, communication circuits, and the like. Although only two social networking site systems 104 are illustrated in FIG. 1, it should be appreciated that the wearable computing device 102 may be configured to interact with a vast array of social networking site systems 104 to identify the social information available to the friend.

As discussed above, the system 100 may also include a social interaction tracking server 108 in some embodiments. The social interaction tracking server 108 may be embodied as a server, a collection of servers, or a cloud service configured to track the social information posted by the user of the wearable computing device 102 and accessible by the friend. In such embodiments, the identification of the social information for display may be offloaded from the wearable computing device 102 to the social interaction tracking server. Additionally, in such embodiments, the wearable computing device 102 may be configured to communicate with the social interaction tracking server 108 to retrieve the social information, or summary thereof, accessible by the friend for display by the wearable computing device 102 as discussed above.

The network 106 may be embodied as any type of communication network capable of facilitating communication between the wearable computing device 102 and the social networking site systems 104 (and the social interaction tracking server 108 in some embodiments). As such, the network 106 may include one or more networks, routers, switches, computers, and/or other intervening devices. For example, the network 106 may be embodied as or otherwise include one or more local or wide area networks, cellular networks, publicly available global networks (e.g., the Internet), an ad hoc network, a short-range communication network or link, or any combination thereof.

Figure 2:
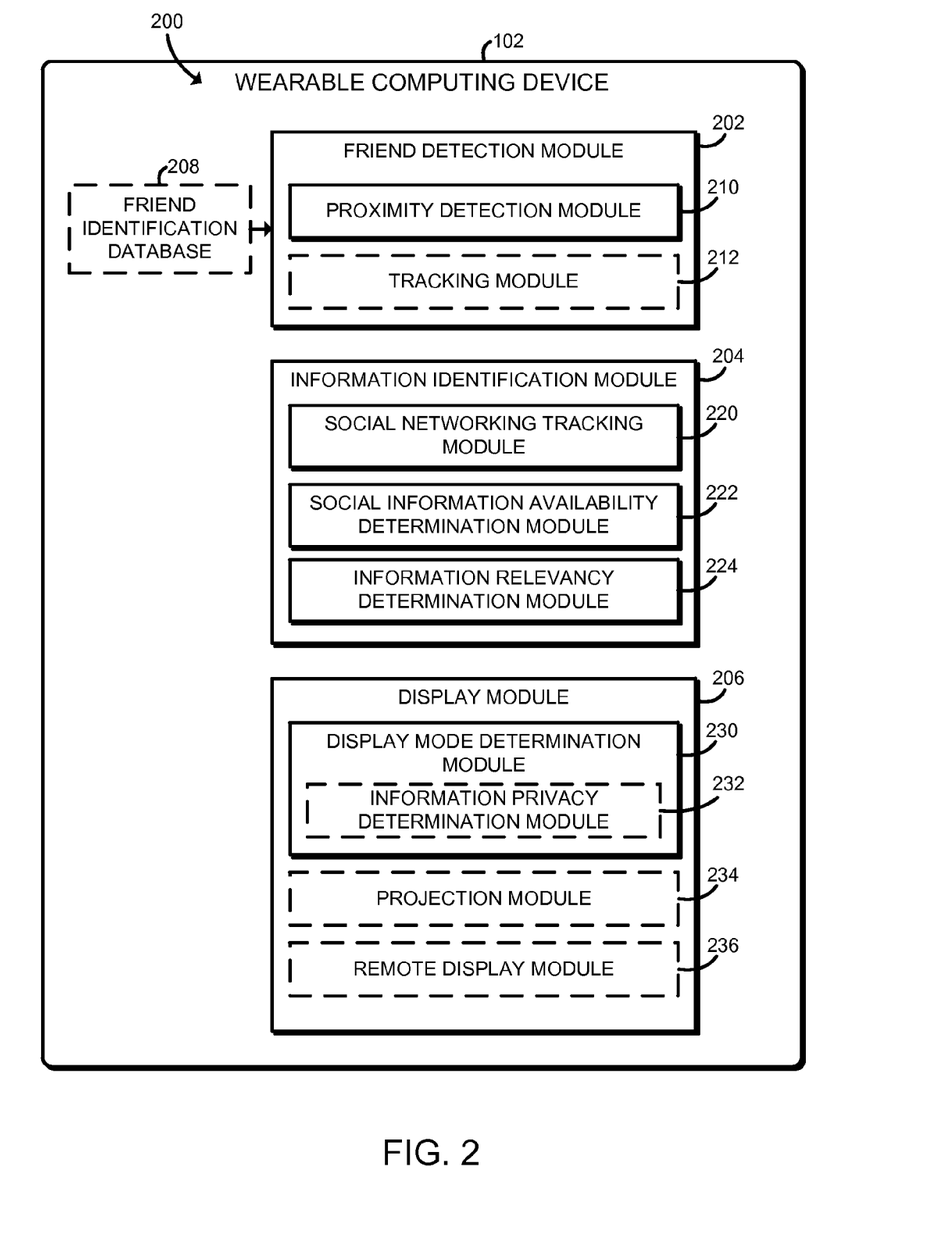
FIG. 2 is a simplified diagram of at least one embodiment of a wearable computing device of the system of FIG. 1.

Referring now to FIG. 2, in use, the wearable computing device 102 may establish an environment 200. The illustrative environment 200 includes a friend detection module 202, an information identification module 204, and a display module 206. Each of the modules and other components of the environment 200 may be embodied as firmware, software, hardware, or a combination thereof. For example the various modules, logic, and other components of the environment 200 may form a portion of, or otherwise be established by, the processor 120, the I/O subsystem 122, an SoC, or other hardware components of the wearable computing device 102. As such, in some embodiments, any one or more of the modules of the environment 200 may be embodied as a circuit or collection of electrical devices (e.g., a friend detection circuit, an information identification circuit, and a display circuit etc.).

The friend detection module 202 is configured to monitor for and determine whether a friend of the user is in the vicinity of the wearable computing device 102. To do so, the friend detection module 202 includes a proximity detection module 210 to detect whether a friend is nearby. As discussed above, the proximity detection module 210 may use any suitable technology or methodology to determine the local presence of a friend based on, for example, the types of sensors 132 available. For example, the proximity detection module 210 may utilize a facial recognition procedure on an image captured by the sensors 132, a voice recognition procedure on audio data captured by the sensors, and/or analyze location data (e.g., GPS data) received from a remote computing device.

In some embodiments, the friend detection module 202 may also include a tracking module 212, which is configured to track the friend to infer the friend's presence near the user. For example, the tracking module 212 may monitor posts, application notifications, or other data published by the friend to determine that the friend is likely in the vicinity of the user. Additionally, in some embodiments, the friend detection module 202 is configured to identify the friend based on a friend identification database 208. The friend identification database 208 may include identity information for each friend of the user across all social networking sites 104 utilized by the user. Of course, in other embodiments, the friend detection module 202 may infer identification of the friend based on other data or resources (e.g., based on a post made by the friend in a user's social networking account).

The information identification module 204 is configured to identify the social information published by the user that is likely to be known, and/or has been actually accessed, by the friend. To do so, the information identification module 204 includes a social networking tracking module 220 configured to track or monitor the social networking sites 104 used by the user. In some cases, the user may access a large number of social networking sites 104. As such, the social networking tracking module 220 may limit the tracked social networking sites 104 in some manner. For example, the social networking tracking module 220 may track or identify only those social networking sites 104 authorized by the user, recently accessed by the user, or on which the user has recently published social information.

The information identification module 204 also includes a social information availability determination module 222 configured to identify social information published by the user and accessible, or accessed, by the friend. To do so, the information identification module 204 may identify those social networking sites tracked by the social networking tracking module 220 on which the friend is interconnected with the user. That is, the information identification module 204 identifies those social networking sites 104 used by the user and on which the friend is interconnected with the user. Once the relevant social networking sites 104 have been identified, the information identification module 204 retrieves the social information published to each social networking site 104.

Due to the potentially massive amount of data retrieved, the social information availability determination module 222 may selectively retrieve social information in some embodiments. To do so, the information identification module 204 may include an information relevancy determination module 224, which identifies the particular social information to be retrieved. The information relevancy determination module 224 may utilize any suitable methodology to determine the relevant social information. For example, the information relevancy determination module 224 may identify social information for retrieval based on the recency of the social information, the relevancy of the social information to the friend, and/or the importance of the social information. Additionally, in some embodiments, the information identification module 204 may identify the available social information known to be accessed by the friend. For example, some messaging systems track when a piece of information has been seen and by whom it has been seen. Alternatively, digital tokens may be used to track views. The information relevancy determination module 224 may identify published information that has been marked by the friend (e.g., the friend has "liked" or commented on the post). Additionally or alternatively, each social networking site 104 may track information accessed by its users, which may be accessed by the information relevancy determination module 224.

The display module 206 is configured to determine a display mode for displaying the social information or summary thereof, and display the social information to the user according to the determined display mode. As such, the display module 206 includes a display mode determination module 230, which is configured to determine the desired display mode for display of the social information. That is, in some embodiments, the user may select the desired display mode (e.g., local display, projection display, transmission to remote display, etc.). Additionally or alternatively, the display mode determination module 230 may infer the display mode based on the local environment (e.g., availability of remote displays) or user context. In some embodiments, the display mode determination module 230 may also include an information privacy determination module 232 configured to identify information of the retrieved social information that have been marked as private or infer such information is likely private. In such embodiments, the display mode determination module 230 may display the identified private information on a local display (e.g., on the display 128), while not displaying the identified private information of a public display (e.g., a remote display).

The display module 206 may also include a projection module 234 and a remote display module 236 in some embodiments. The projection module 234 is configured to control the projection of the identified social information, or summary thereof, in response to the user selecting or opting for a projection display mode. Similarly, the remote display module 236 is configured to control the display of the identified social information, or summary thereof, on a remote display (e.g., the computing device of the friend or public display) in response to the user selecting or opting for a remote display mode.

Figure 3:
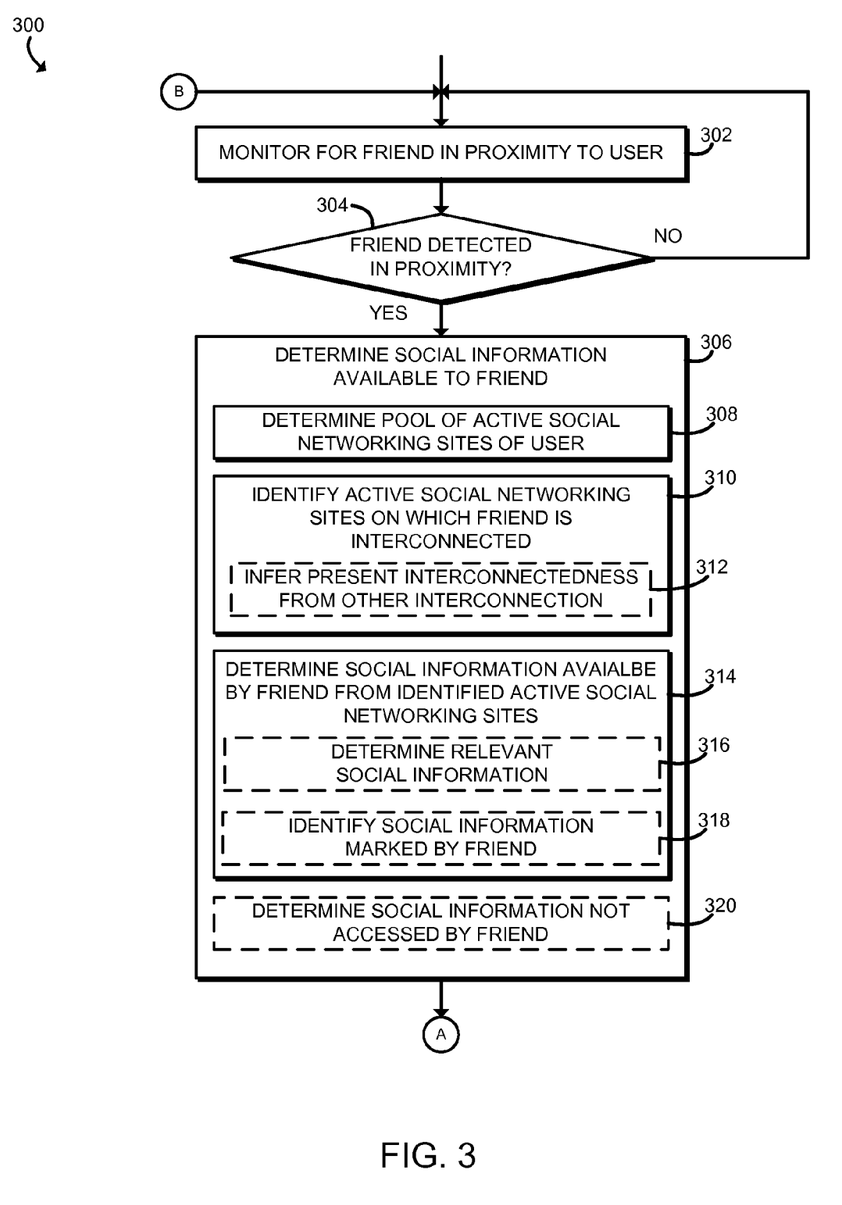
FIGS. 3 and 4 are a simplified diagram of at least one method for determining social information available to a friend of the user.
Figure 4:
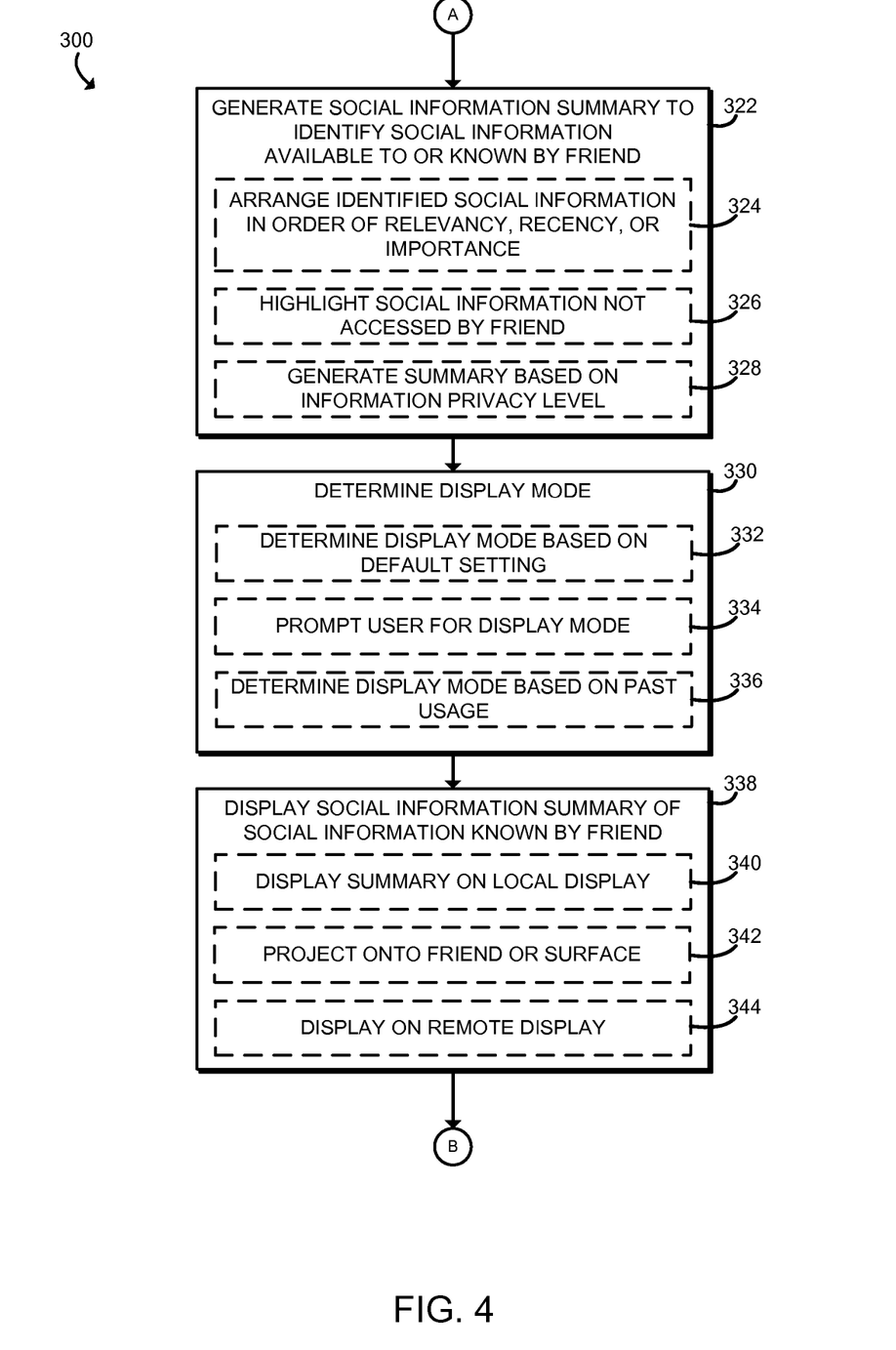

Referring now to FIGS. 3 and 4, in use, the wearable computing device 102 may execute a method 300 for determining social information available to a friend of the user. The method 300 begins with block 302 in which the wearable computing device 102 monitors for friends of the user in proximity to the user. As discussed above, the wearable computing device 102 may utilize any suitable technology and/or methodology to determine whether a friend is in the local vicinity including, facial recognition, voice recognition, and location determination techniques as discussed above.

If a friend is detected within proximity to the user in block 304, the method 300 advances to block 306 in which the wearable computing device 102 determines the social information available to the friend of the user. To do so, in block 308, the wearable computing device 102 determines the pool of active social networking sites of the user. As discussed above, the wearable computing device 102 may track those social networking sites 104 actively used by the user (e.g., social networking sites visited by the user or on which the user has published social information within a reference period of time). Alternatively, in other embodiments, the wearable computing device 102 may use every social networking site on which the user has registered or otherwise visits.

In block 310, the wearable computing device 102 identifies those social networking sites 104 on which the friend is interconnected to the user from the social networking sites 104 identified in block 310. In some embodiments, the wearable computing device 102 may have explicit knowledge of such interconnectedness (e.g., the friend is on the user's friend list or contact list). In other embodiments, in block 312, the wearable computing device 102 may infer an interconnectedness between the user and friend based on a past interconnectedness or an existing interconnectedness at another social networking site 104.

Subsequently, in block 314, the wearable computing device 102 determines social information available to the friend from the social networking sites 104 identified in block 310. As discussed above, in some embodiments, the wearable computing device 102 may identify and retrieve all social information from the social networking sites 104 identified in block 310. Alternatively, in other embodiments, the social networking sites 104 identified in block 310 may retrieve only social information deemed to be relevant (e.g., based on publication date, importance, relevance to the friend, etc.) in block 316. Additionally, in some embodiments, the wearable computing device 102 may identify retrieved social information that has been actually accessed by the friend in block 318. For example, the wearable computing device 102 may identified access information based on whether the social information has been marked by the friend (e.g., a "like" or post by the friend). Further, in block 320, the wearable computing device 102 may determine social information known to be not accessed by the friend (e.g., based on publication date, a privacy setting, the last log-on to the social networking site by the friend, etc.).

After the social information of the user that is available to the friend has been determined in block 306, the method 300 advances to block 322 of FIG. 4. In block 322, the wearable computing device 102 generates a social information summary based on the social information of the user identified as being available to the friend. In some embodiments, the social information summary may be identical to the identified social information. However, in other embodiments, the wearable computing device 102 summarizes the identified social information to better configure the information for display to the user. Additionally, in some embodiments, the wearable computing device 102 may arrange the social information in the summary in block 324. The wearable computing device 102 may arrange the social information based on any suitable criteria such as, for example, relevancy of the information to the friend, recency of the information, and/or importance of the information to the user or friend. Additionally, in some embodiments, the wearable computing device 102 may highlight the social information of the summary that is known to have been accessed by the friend. To do so, the wearable computing device 102 may use any method to highlight such information including special fonts, colors, accents, or the like.

Further, as discussed above, some of the identified social information may be determined to be private information. As such, the wearable computing device 102 may generate the summary of social information based on a privacy level selected by the user. That is, based on the level of privacy desired by the user, the wearable computing device 102 may remove identified social information from the summary (or remove some information only from summary displayed on remote devices).

After the social information summary has been generated in block 322, the method 300 advances to block 330 in which the wearable computing device 102 determines the desired display mode (e.g., local, projection, remote display, etc.) for the social information. To do so, in block 332, the wearable computing device 102 may utilize a default display mode to display the social information (e.g. on the local display 128). Alternatively, in block 334, the wearable computing device 102 may prompt the user for selection of the desired display mode. Additionally, in block 336, the wearable computing device 102 may infer the current display mode based on past usage, which may include context information regarding both the friend and the type of information to be shared. For example, the wearable computing device 102 may determine the appropriate display mode based on the display mode used when the user last met the friend.

Once the display mode has been determined in block 330, the method 300 advances to block 338 in which the social information summary of social information known by the friend is displayed to the user. To do so, in block 340, the wearable computing device 102 may display the social information summary on a local display 128. Additionally or alternatively, in block 342, the wearable computing device 102 may display the social information summary on a remote surface, such as the friend herself (e.g., on a shirt of the friend). Additionally or alternatively, in block 344, the wearable computing device 102 may display the social information summary on a remote display, such as a display of a computing device of the friend or a public display device. The method 300 subsequently loops back to block 302 in which the wearable computing device 102 monitors for additional friends in the vicinity of the user.

Figure 5:
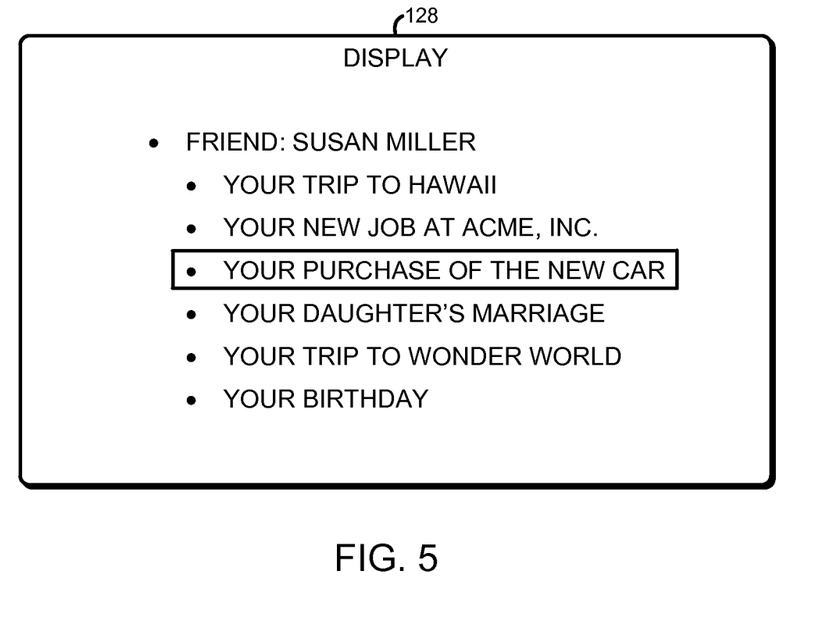
FIG. 5 is a simplified illustration of at least one embodiment of a display of social information available to a friend of the user.

Referring now to FIG. 5, an illustrative display 500 of a social information summary is shown. The illustrative display 500 may be shown on the local display 128, projected on to the friend, or shown on a remote display. The display 500 identifies the name of the friend ("Susan Miller") and provides a summary of social information published by the user and available to friend (i.e., social information likely known by the friend). Additionally, the display 500 includes a highlighted piece of social information related to the purchase of a new car. As discussed above, such highlighting may indicate social information likely not known by the friend or social information known to have been accessed by the friend. In this way, a user of the wearable computing device 102 is able to identify social information about the user that is likely known by the friend, which may be used to start conversations, remind the user that the friend knows about the information, and/or remind the user of information to pass along to the friend.

EXAMPLES

Illustrative examples of the devices, systems, and methods disclosed herein are provided below. An embodiment of the devices, systems, and methods may include any one or more, and any combination of, the examples described below.

Example 1 includes a wearable computing device for determining social information of a user available to a friend of the user, the wearable computing device comprising a friend detection module to detect the presence of a friend of the user of the wearable computing device within proximity to the user, wherein the detection of the presence of the friend is based on a pre-established online social networking relationship between the friend and the user; an information identification module to identify, in response to the detection of the presence of the friend, social information that was (i) previously published by the user on a social networking site and (ii) accessible by the friend; and a display module to display the identified social information to the user.

Example 2 includes the subject matter of Example 1, and wherein to identify the social information comprises to identify a pool of social networking sites used by the user.

Example 3 includes the subject matter of any of Examples 1 and 2, and wherein to identify the pool of social networking sites comprises to identify a pool of social networking sites visited by the user within a reference period of time.

Example 4 includes the subject matter of any of Examples 1-3, and wherein to identify the social information comprises to identify, from the pool of social networking sites used by the user, one or more social networking sites on which the friend is interconnected with the user.

Example 5 includes the subject matter of any of Examples 1-4, and wherein to identify the one or more social networking sites comprises to infer an interconnection between the friend and the user on a social networking site of the pool of social networking sites based on another interconnection between the friend and the user on a different social networking site.

Example 6 includes the subject matter of any of Examples 1-5, and wherein to identify the social information comprises to identify social information accessed by the friend from the one or more networking sites.

Example 7 includes the subject matter of any of Examples 1-6, and wherein to identify social information accessed by the friend comprises to identify social information marked by the friend.

Example 8 includes the subject matter of any of Examples 1-7, and wherein to identify the social information comprises to identify social information that is (i) available to the friend and (ii) not accessed by the friend.

Example 9 includes the subject matter of any of Examples 1-8, and wherein to identify social information not accessed by the friend comprises to identify social information unmarked by the friend.

Example 10 includes the subject matter of any of Examples 1-9, and wherein to identify social information comprises to identify social information published by the user on the social networking site within a reference period of time.

Example 11 includes the subject matter of any of Examples 1-10, and wherein to display the identified social information comprises to generate a summary of the identified social information for display, and display the summary of the identified social information to the user, wherein to display the summary of the identified social information comprises to highlight social information not accessed by the friend.

Example 12 includes the subject matter of any of Examples 1-11, and wherein to display the identified social information comprises to generate a summary of the identified social information for display and to display the summary of the identified social information, wherein the social information is arranged in the summary based on at least one of relevancy of social information to the friend, recency of the social information, or importance of the social information to user.

Example 13 includes the subject matter of any of Examples 1-12, and wherein to display the social information comprises to project the social information onto the friend or a remote surface.

Example 14 includes the subject matter of any of Examples 1-13, and wherein to display the social information comprises to transmit the social information to a computing device of the friend for display thereon.

Example 15 includes the subject matter of any of Examples 1-4, and wherein to display the social information comprises to display the social information on a display of the wearable computing device.

Example 16 includes the subject matter of any of Examples 1-15, and wherein to display the social information comprises to display the social information on a display remote from the wearable computing device.

Example 17 includes the subject matter of any of Examples 1-16, and wherein to detect the presence of the friend of the user comprises to detect the presence of the friend within a reference distance of the wearable computing device.

Example 18 includes the subject matter of any of Examples 1-17, and wherein to detect the presence of the friend of the user comprises to capture, via a camera of the wearable computing device, an image of the friend and perform a facial recognition procedure of the image to identify the friend.

Example 19 includes the subject matter of any of Examples 1-18, and wherein to detect the presence of the friend of the user comprises to capture, via an audio sensor of the wearable computing device, audio data from the vicinity of the user and perform a voice recognition procedure on the audio data to identify the friend.

Example 20 includes the subject matter of any of Examples 1-19, and wherein to detect the presence of the friend of the user comprises to receive communications from a remote computing device and determine the presence of the friend based on the received communications.

Example 21 includes the subject matter of any of Examples 1-20, and, wherein the remote computing device is carried by the friend.

Example 22 includes the subject matter of any of Examples 1-21, and wherein the remote computing device is an in-door person tracking system.

Example 23 includes the subject matter of any of Examples 1-22, and wherein to detect the presence of the friend of the user comprises to detect the presence of the friend based on historical navigation data related to the friend.

Example 24 includes a method for determining social information of a user of a wearable computing device that is available to a friend of the user, the method comprising detecting, by the wearable computing device, the presence of a friend of the within proximity to the user, wherein the detecting of the presence of the friend is based on a pre-established online social networking relationship between the friend and the user; identifying, by the wearable computing device and in response to detecting the presence of the friend, social information that was (i) previously published by the user on a social networking site and (ii) accessible by the friend; and displaying the identified social information to the user.

Example 25 includes the subject matter of Example 24, and wherein identifying the social information comprises identifying a pool of social networking sites used by the user.

Example 26 includes the subject matter of any of Examples 24 and 25, and wherein identifying the pool of social networking sites comprises identifying a pool of social networking sites visited by the user within a reference period of time.

Example 27 includes the subject matter of any of Examples 24-26, and wherein identifying the social information comprises identifying, from the pool of social networking sites used by the user, one or more social networking sites on which the friend is interconnected with the user.

Example 28 includes the subject matter of any of Examples 24-27, and wherein identifying the one or more social networking sites comprises inferring an interconnection between the friend and the user on a social networking site of the pool of social networking sites based on another interconnection between the friend and the user on a different social networking site.

Example 29 includes the subject matter of any of Examples 24-28, and wherein identifying the social information comprises identifying social information accessed by the friend from the one or more networking sites.

Example 30 includes the subject matter of any of Examples 24-29, and wherein identifying social information accessed by the friend comprises identifying social information marked by the friend.

Example 31 includes the subject matter of any of Examples 24-30, and wherein identifying the social information comprises identifying social information that is (i) available to the friend and (ii) not accessed by the friend.

Example 32 includes the subject matter of any of Examples 24-31, and wherein identifying social information not accessed by the friend comprises identifying social information unmarked by the friend.

Example 33 includes the subject matter of any of Examples 24-32, and wherein identifying social information comprises identifying social information published by the user on the social networking site within a reference period of time.

Example 34 includes the subject matter of any of Examples 24-33, and wherein displaying the identified social information comprises generating a summary of the identified social information for display, and displaying the summary of the identified social information to the user, wherein displaying the summary of the identified social information comprises highlighting social information not accessed by the friend.

Example 35 includes the subject matter of any of Examples 24-34, and wherein displaying the identified social information comprises generating a summary of the identified social information for display and displaying the summary of the identified social information, wherein the social information is arranged in the summary based on at least one of relevancy of social information to the friend, recency of the social information, or importance of the social information to user.

Example 36 includes the subject matter of any of Examples 24-35, and wherein displaying the social information comprises projecting the social information onto the friend or a remote surface.

Example 37 includes the subject matter of any of Examples 24-36, and wherein displaying the social information comprises transmitting the social information to a computing device of the friend for display thereon.

Example 38 includes the subject matter of any of Examples 24-37, and wherein displaying the social information comprises displaying the social information on a display of the wearable computing device.

Example 39 includes the subject matter of any of Examples 24-38, and wherein displaying the social information comprises displaying the social information on a display remote from the wearable computing device.

Example 40 includes the subject matter of any of Examples 24-39, and wherein detecting the presence of the friend of the user comprises detecting the presence of the friend within a reference distance of the wearable computing device.

Example 41 includes the subject matter of any of Examples 24-40, and wherein detecting the presence of the friend of the user comprises to capturing, via a camera of the wearable computing device, an image of the friend and performing a facial recognition procedure of the image to identify the friend.

Example 42 includes the subject matter of any of Examples 24-41, and wherein detecting the presence of the friend of the user comprises to capturing, via an audio sensor of the wearable computing device, audio data from the vicinity of the user and performing a voice recognition procedure on the audio data to identify the friend.

Example 43 includes the subject matter of any of Examples 24-42, and wherein detecting the presence of the friend of the user comprises to receiving communications from a remote computing device and determine the presence of the friend based on the received communications.

Example 44 includes the subject matter of any of Examples 24-43, and wherein the remote computing device is carried by the friend.

Example 45 includes the subject matter of any of Examples 24-44, and wherein the remote computing device is an in-door person tracking system.

Example 46 includes the subject matter of any of Examples 24-45, and wherein detecting the presence of the friend of the user comprises detecting the presence of the friend based on historical navigation data related to the friend.

Example 47 includes one or more computer-readable storage media comprising a plurality of instructions stored thereon that, in response to execution, cause a wearable computing device to perform the method of any of Examples 24-46.

Example 48 includes a wearable computing device for authenticating a user, the wearable computing device comprising means for performing the method of any of Examples 24-46.

The invention claimed is:

1. A wearable computing device for determining social information of a user available to a friend of the user, the wearable computing device comprising:
   a processor; and
   a memory coupled to the processor and having stored therein a plurality of instructions that, when executed, cause the wearable computing device to:
      detect presence of the friend of the user of the wearable computing device within a predetermined proximity to the user, wherein the detection of the presence of the friend is based on a pre-established online social networking relationship between the friend and the user;
      identify, in response to the detection of the presence of the friend, social information that was (i) previously published by the user on a social networking site, wherein access to the social information published on the social networking site is restricted from general public and (ii) accessible by the friend on the social networking site;
      generate a summary of the identified social information for display to the user, wherein to generate the summary of the identified social information comprises to highlight social information not accessed by the friend; and
      display, in response to the detection of the presence of the friend, the summary of the identified social information to the user.

2. The wearable computing device of claim 1, wherein to identify the social information comprises to identify a pool of social networking sites used by the user.

3. The wearable computing device of claim 2, wherein to identify the social information comprises to identify, from the pool of social networking sites used by the user, one or more social networking sites on which the friend is interconnected with the user.

4. The wearable computing device of claim 3, wherein to identify the social information comprises to identify social information accessed by the friend from the one or more networking sites.

5. The wearable computing device of claim 4, wherein to identify the social information accessed by the friend comprises to identify social information marked by the friend.

6. The wearable computing device of claim 3, wherein to identify the social information comprises to identify social information that is (i) available to the friend and (ii) not accessed by the friend.

7. The wearable computing device of claim 6, wherein to identify the social information not accessed by the friend comprises to identify social information unmarked by the friend.

8. The wearable computing device of claim 1, wherein to display the identified social information comprises to generate the summary of the identified social information for display and to display the summary of the identified social information, wherein the social information is arranged in the summary based on at least one of relevancy of the social information to the friend, recency of the social information, or importance of the social information to user.

9. One or more non-transitory, computer-readable storage medium comprising a plurality of instructions stored thereon that, in response to execution, cause a wearable computing device to:
   detect presence of a friend of a user of the wearable computing device within a predetermined proximity to the user, wherein the detecting of the presence of the friend is based on a pre-established online social networking relationship between the friend and the user;
   identify, in response to the detection of the presence of the friend, social information that was (i) previously published by the user on a social networking site, wherein access to the social information published on the social networking site is restricted from general public and (ii) accessible by the friend on the social networking site;
   generate a summary of the identified social information for display to the user, wherein to generate the summary of the identified social information comprises to highlight social information not accessed by the friend; and display, in response to the detection of the presence of the friend, the summary of the identified social information to the user.

10. The one or more non-transitory, computer-readable storage medium of claim 9, wherein to identify the social information comprises to identify a pool of social networking sites used by the user.

11. The one or more non-transitory, computer-readable storage medium of claim 10, wherein to identify the social information comprises to identify, from the pool of social networking sites used by the user, one or more social networking sites on which the friend is interconnected with the user.

12. The one or more non-transitory, computer-readable storage medium of claim 11, wherein to identify the social information comprises to identify social information accessed by the friend from the one or more networking sites.

13. The one or more non-transitory, computer-readable storage medium of claim 12, wherein to identify the social information accessed by the friend comprises to identify social information marked by the friend.

14. The one or more non-transitory, computer-readable storage medium of claim 11, wherein to identify the social information comprises to identify social information that is (i) available to the friend and (ii) not accessed by the friend.

15. The one or more non-transitory, computer-readable storage media of claim 14, wherein to identify the social information not accessed by the friend comprises to identify social information unmarked by the friend.

16. A method for determining social information of a user of a wearable computing device that is available to a friend of the user, the method comprising:

detecting, by the wearable computing device, presence of the friend of the user of the wearable computing device within a predetermined proximity to the user, wherein the detecting of the presence of the friend is based on a pre-established online social networking relationship between the friend and the user;

identifying, by the wearable computing device and in response to detecting the presence of the friend, social information that was (i) previously published by the user on a social networking site, wherein access to the social information published on the social networking site is restricted from general public and (ii) accessible by the friend on the social networking site;

generating a summary of the identified social information for display to the user, wherein generating the summary of the identified social information comprises highlighting social information not accessed by the friend; and displaying, in response to detecting the presence of the friend, the identified social information to the user.

17. The method of claim 16, wherein identifying the social information comprises identifying a pool of social networking sites used by the user.

18. The method of claim 17, wherein identifying the social information comprises identifying, from the pool of social networking sites used by the user, one or more social networking sites on which the friend is interconnected with the user.

19. The method of claim 18, wherein identifying the social information comprises identifying social information accessed by the friend from the one or more networking sites.

20. The method of claim 19, wherein identifying the social information accessed by the friend comprises identifying social information marked by the friend.

21. The method of claim 18, wherein identifying the social information comprises identifying social information that is (i) available to the friend and (ii) not accessed by the friend.

22. The method of claim 21, wherein identifying the social information not accessed by the friend comprises identifying social information unmarked by the friend.

* * * * *